United States Patent
Kalhan et al.

(10) Patent No.: US 11,138,181 B2
(45) Date of Patent: Oct. 5, 2021

(54) DYNAMIC DEACTIVATION OF COLD DATABASE IN DATABASE SERVICE

(71) Applicant: Microsoft Technology Licensing, LLC, Redmond, WA (US)

(72) Inventors: Ajay Kalhan, Redmond, WA (US); Tomas Talius, Sammamish, WA (US); Pankaj Arora, Redmond, WA (US); Qun Guo, Bellevue, WA (US); Shize Xu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 910 days.

(21) Appl. No.: 15/199,345

(22) Filed: Jun. 30, 2016

(65) Prior Publication Data
US 2018/0004795 A1    Jan. 4, 2018

(51) Int. Cl.
*G06F 16/00*    (2019.01)
*G06F 16/23*    (2019.01)
*G06F 16/21*    (2019.01)
*G06F 9/50*    (2006.01)

(52) U.S. Cl.
CPC .......... *G06F 16/2358* (2019.01); *G06F 9/505* (2013.01); *G06F 16/217* (2019.01); *G06F 16/2308* (2019.01)

(58) Field of Classification Search
CPC ............... G06F 16/2358; G06F 16/217; G06F 16/2308; G06F 9/505
USPC ........................................................ 707/609
See application file for complete search history.

(56) References Cited

U.S. PATENT DOCUMENTS

| 6,880,156 | B1 | 4/2005 | Landherr et al. |
| 6,950,848 | B1 | 9/2005 | Yousefi'zadeh |
| 7,080,378 | B1 | 7/2006 | Noland et al. |
| 8,335,771 | B1 * | 12/2012 | Natanzon ............ G06F 11/2069 707/684 |
| 8,825,864 | B2 | 9/2014 | Li et al. |

(Continued)

FOREIGN PATENT DOCUMENTS

| CN | 202872848 U | 4/2013 |
| CN | 104899274 A | 9/2015 |

(Continued)

OTHER PUBLICATIONS

"Automated Resource Provisioning in Cloud Environments", Published on: Apr. 12, 2011 Available at: https://www.manageengine.com/products/applications_manager/automate-cloud-resource-management.html.

(Continued)

*Primary Examiner* — Monica M Pyo
(74) *Attorney, Agent, or Firm* — Fiala & Weaver P.L.L.C.

(57) ABSTRACT

Managing databases implemented in a cloud computing environment. A method includes detecting that a database implemented in the cloud computing environment is in a state of non-use. The method further includes as a result of detecting that a database implemented in the cloud computing environment is in a state of non-use, instantiating a workload in the cloud computing environment to deactivate the database. The workload is configured to store metadata for the database and database data remotely in cloud storage such that the database can be reactivated at a later time.

20 Claims, 2 Drawing Sheets

(56) References Cited

U.S. PATENT DOCUMENTS

| | | | |
|---|---|---|---|
| 8,849,691 B2* | 9/2014 | Sanabria | G06Q 10/06316 705/7.26 |
| 8,880,687 B1 | 11/2014 | Chandrachari et al. | |
| 9,009,294 B2 | 4/2015 | Dawson et al. | |
| 9,590,872 B1* | 3/2017 | Jagtap | H04L 41/145 |
| 2006/0184535 A1 | 8/2006 | Kaluskar et al. | |
| 2007/0220028 A1 | 9/2007 | Hikawa et al. | |
| 2009/0144720 A1 | 6/2009 | Roush et al. | |
| 2010/0005097 A1 | 1/2010 | Liang et al. | |
| 2010/0218183 A1* | 8/2010 | Wang | G06F 1/3228 718/1 |
| 2011/0209145 A1* | 8/2011 | Chen | G06F 9/45558 718/1 |
| 2012/0204187 A1 | 8/2012 | Breiter et al. | |
| 2012/0296977 A1 | 11/2012 | Ellison et al. | |
| 2013/0066837 A1 | 3/2013 | Colrain et al. | |
| 2015/0234682 A1 | 8/2015 | Dageville et al. | |

FOREIGN PATENT DOCUMENTS

| | | |
|---|---|---|
| CN | 105338027 A | 2/2016 |
| EP | 2616966 A1 | 7/2013 |
| RU | 2208834 C2 | 7/2003 |
| RU | 2436150 C2 | 12/2011 |
| RU | 2440694 C2 | 1/2012 |

OTHER PUBLICATIONS

Guruprasad, et al., "Resource Provisioning Techniques in Cloud Computing Environment: A Survey", In International Journal of Research in Computer and Communication Technology, vol. 3, Issue 3, Mar. 2014, pp. 395-401.

Paulraj, et al., "Efficient Resource Provisioning Using Virtualization Technology in Cloud Environment", In International Journal of Innovative Research in Science, Engineering and Technology, vol. 3, Special Issue 3, Mar. 2014, pp. 2200-2205.

"Getting Started with Amazon Glacier", Published on: Jan. 19, 2015 Available at: https://aws.amazon.com/glacier/getting-started/.

Michon, et al., "Free elasticity and free CPU power for scientific workloads on IaaS Clouds", In Proceedings of IEEE 18th International Conference on Parallel and Distributed Systems, Dec. 17, 2012, 8 pages.

"International Search Report and the Written Opinion issued in PCT Application No. PCT/US2017-039351 dated Aug. 2, 2017."

"Office Action Issued in Chile Patent Application No. 201803674", dated Jan. 9, 2020, 13 Pages.

"Office Action Issued in Colombia Patent Application No. NC2018/0013677", dated Jan. 13, 2020, 16 Pages.

"Office Action Issued in Indonesian Patent Application No. P00201811023", dated Nov. 20, 2019, 3 Pages.

"Office Action Issued in European Patent Application No. 17735359.6", dated Jul. 29, 2020, 7 Pages.

"Office Action Issued in Chile Patent Application No. 201803674", dated May 18, 2020, 11 Pages.

"Office Action Issued in Israeli Patent Application No. 263855", dated Oct. 13, 2020, 8 Pages.

"Office Action Issued in Russian Patent Application No. 2018146907", dated Sep. 22, 2020, 7 Pages. (W/O English Translation).

"Office Action Issued in Australian Patent Application No. 2017291514", dated Jun. 10, 2021, 3 Pages.

"First Office Action and Search Report Issued in Chinese Patent Application No. 201780035205 5", dated Jun. 28, 2021, 21 Pages.

"Notice of Allowance Issued in Russian Patent Application No. 2018146907", dated Jun. 10, 2021, 21 Pages.

"Office Action Issued in Israel Patent Application No. 263855", dated Jun. 24, 2021, 9 Pages.

* cited by examiner

DYNAMIC DEACTIVATION OF COLD DATABASE IN DATABASE SERVICE

BACKGROUND

Background and Relevant Art

In cloud computing, clusters have finite amounts of hardware resources. When a database is kept alive without running any user workload for an extended period of time, it does nothing useful but still takes up valuable resources such as cluster resources, internal applications and tools such as backup applications or tools, telemetry applications or tools, etc.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a cloud computing environment. The method includes acts for managing databases implemented in the cloud computing environment. The method includes detecting that a database implemented in the cloud computing environment is in a state of non-use. The method further includes as a result of detecting that a database implemented in the cloud computing environment is in a state of non-use, instantiating a workload in the cloud computing environment to deactivate the database. The workload is configured to store metadata for the database and database data remotely in cloud storage such that the database can be reactivated at a later time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

In cluster computing environments implementing databases, to avoid unnecessary work and save on the cost of goods sold resulting from cold databases, embodiments illustrated herein can detect cold databases and deactivate them. In some embodiments, this can be done by keeping minimal metadata and database files remotely, and removing all runtime resources, as well as database instances at the cluster. Deactivated databases are reactivated automatically when a user connects to them or when database files need to be updated by the system.

Thus, embodiments may be configured to reliably detect inactiveness in user workloads. Embodiments may alternatively or additionally be configured to implement a deactivation workflow configured to ensure transactional consistency of data. Namely, all committed user transactions are persisted in a data/log file and backed up. Embodiments may alternatively or additionally be configured such that in a deactivated state, data, log, and/or backup files survive over retention based cleanup. Embodiments may alternatively or additionally be configured such that on-disk data or format changes are able to cause on-demand activation of databases without a user needing to connect to the databases. Embodiments may alternatively or additionally be configured such that deactivation and/or activation of workflows is idempotent. In case of a cluster and/or software issue, embodiments should be able to force deactivation or activation as needed to try out different clusters.

Figure 1:
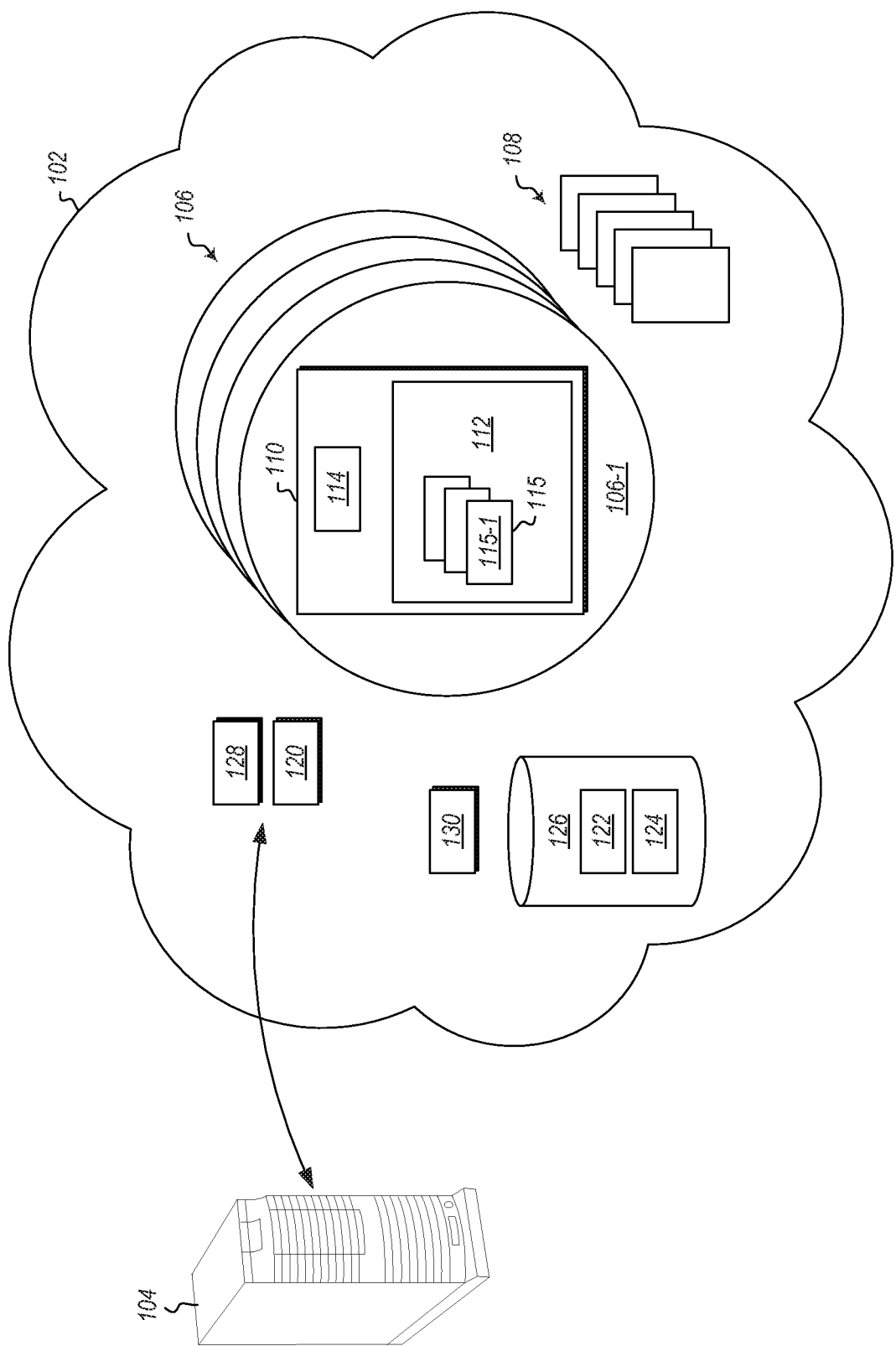
FIG. 1 illustrates a cloud service hosting databases.

Referring now to FIG. 1, an example environment is illustrated. FIG. 1 illustrates a cloud service 102. The cloud service 102 is configured to host database applications and provide database functionality to various users. For example, FIG. 1 illustrates a user machine 104 that can connect to the cloud service 102 to access database services provided by the cloud service 102.

A cloud service includes a plurality 106 of clusters. A given cluster such as cluster 106-1 is a logical division. Each cluster is implemented on one or more physical machines such as the set of physical machines 108. Thus, each cluster can use resources of the physical machines such as CPU cycles, memory, storage 1/O, network functionality, etc.

Each cluster can host one or more database nodes such as the database node 110. Each database node can host a database service such as database service 112 and a local agent such as local agent 114. Each database node can also host a number of databases, such as the set of databases 115. The database service 112 provides database functionality to a user. The local agent 114 is the bridge between a database node and rest of the clusters in a data center.

Activation and deactivation workflows for activating and deactivating databases in the set of databases 115 are driven by a workflow service 120. Deactivation is triggered by the database service 112.

The database service 112 detects no user activity over period of time and as a result notifies the workflow service 120. As a result, a deactivation workflow starts to deactivate a database, such as database instance 115-1. At this point, any database interaction with the database instance 115-1 will trigger an activation workflow, as explained in more detail below.

During the deactivation workflow, the workflow service 120 will contact the local agent 114 to monitor for new user activity from the user machine 104 or cloud service interactions (such as database system updates or other interactions). If interactions are detected, deactivation is cancelled. If no interactions are detected, deactivation is completed, including causing metadata 122 for the database instance 115-1 and database data 124 for the database instance 115-1 to be stored in remote storage 126.

An activation workflow is triggered by a new user connection from a user machine 104. A new connection reaches the cluster 128. The cluster 128 determines that the database instance 115-1 is not running and indicates to the workflow service 120 to activate the database instance 115-1. The activation workflow retrieves the metadata 122 and database data 124 from the remote storage 126. The activation workflow creates a new instance of the database, database instance 115-1. At this point, the new connection should be able to reach the database instance 115-1.

Thus, upon a first user connection the system will activate the database instance 115-1 by creating/attaching to necessary physical resources provided by physical machines 108 underlying the plurality of clusters 106. The database instance 115-1 will remain active as long as there is user activity from the user machine 104. When the number of active requests (from the user machine 104 or from other system components) drops to 0 for configurable amount of time, the system will shut-down the physical database instance 115-1, but will persist remote storage files, such as metadata 122 and database data 124. A next user connection after deactivation will cause the physical database instance 115-1 to be started again using remote storage files, such as metadata 122 and database data 124, saved off earlier.

In alternative embodiments, physical database placement may be dynamic. That is, database placement is not tied to the database node hosting the database prior to deactivation.

In some such embodiments, at the time of activation the system will choose the best qualified database service instance based certain criteria. For example, preference may be given to: a set of database nodes with more capacity, a set of database nodes with targeted hardware choices, or a database instance with more appropriate computing power based on usage patterns.

At deactivation time, the system shuts down the physical database and frees up a spot in the database service instance to activate a different database if needed. Note that an entire database service can be shut down when the last database in that service is shut down.

The following now illustrates additional details with respect to shutdown. The system, such as the local agent 114 or the database service 112 detects no user (and in some embodiments, no system) activity over period of time, which results in sending a database deactivation request to workflow service 120, In response, the deactivation workflow starts and updates metadata along the way.

A runtime 130 updates necessary metadata to indicate that a database is in a deactivated state. Thus, any new connection for the database at this point will see updated metadata, which will trigger reactivation. The workflow service 120 continues to contact the local agent 114 to determine if the database service 112 has new user activity since the deactivation request. If not, the deactivation workflow will drop runtime resources associated with the database service.

Reactivation is triggered by a new user connection. A new connection request reaches the cluster 128. The cluster 128 looks up corresponding metadata which indicate the database service is in deactivated state. The workflow service 120 POSTs a database activation request to the workflow service 120 activates the database instance 115-1. The activation workflow creates the necessary runtime resources and associated metadata. New connections are now able to reach the database instance 115-1 at this point.

Some embodiments may attempt to be conservative with deactivation. This may be done by checking and rechecking multiple overlapping signals to avoid race conditions. The deactivation workflow may need to check for an abort signal and rollback when it can. In other words, if a new connection comes in while deactivation is in progress, activation should win without having to wait for the deactivation workflow to complete.

The following illustrates additional details with respect to database idle detection logic. A background thread in database service runs every hour (or some other configurable time period) and checks each user database instance. In particular, the background thread may check for each database instance. For each user database instance various signals may be checked. For example, embodiments may check to ensure that there are no active logins. Alternatively or additionally, embodiments may monitor various primary workload resource indicators, such as indicators indicating no active sessions, no active workers, no active requests, no new requests completed, no resource consumption by user workloads; no CPU usage, no entity is holding lock on the database (although in some embodiments this may be eliminated as a system background task might be holding such lock), no pending log for a backup, etc.

Deactivation may occur when some time period has elapsed between a last database action and a current time. For example, embodiments may detect a delta between a last active update time and the results of a request asking for the current time. When this delta crosses a threshold (which may be a configuration threshold, such as by configuring at the logical server level or the logical database level) a database deactivation workflow will be begun.

In some embodiments, deactivation may begin and a transaction may be started during deactivation. During the transaction a user connection may be deactivated if there is no new connection to activate the DB for a while. In this case, the backup may not run which means the last portions of a committed transaction will not be backed up.

To address these issues, some embodiments can lock the database instance during deactivation and reject new logins. This is simple and safe and results in no active or pending transaction log to deal with. However, the database instance will appear unavailable, and it can be difficult to unlock the database instance before deactivation is complete. Additionally, an embodiment may have to poll the workflow service 120 to identify the completion of the deactivation workflow. Further, the deactivation status may need to be surfaced to the user during unavailability, thereby destroying the illusion of seamlessness.

Alternatively, to address these issues, the deactivation status can be indicated in a database table indicating that a database is being deactivated. A new user connection can check this status and send appropriate requests to workflow service 120 as needed to reactivate the database instance to begin the transaction.

Alternatively, to address these issues, the deactivation workflow can wait for transaction backup logs to be complete before deactivating the database instance. However, some embodiments may remove an existing connection, such that embodiments still need to deal with the possibility that the user connection is still there and either abort deactivation or kill the user connection.

Some embodiments may address these issues by checking the same set of signals as the deactivation logic. The deactivation workflow can check the outcome before deactivating the database instance to decide.

In some embodiments, there may be a gap between the time the deactivation workflow updates the metadata to reflect a deactivating state for new login attempts to see. As such, it is still possible for a user connection to reach a physical database instance after embodiments have checked and rechecked such that some change may be performed right before detach. This can be addressed by the deactivation workflow waiting for the metadata change which reflects a deactivating state, before moving on with the rest of deactivation.

Alternatively, this could be addressed by re-checks for user activity before deactivating the physical database instance provide an indicator, such as setting or clearing a bit, in a database table. A login code path checks this bit to block user connections from that point on.

This bit can be cleaned up using zero or more different actions. For example, if the deactivation workflow moves on to detach the database then the database table will also be removed, such that no cleanup is required. If the deactivation workflow fails to detach the database and an activation request comes in, the activation workflow may include a step to clear this database table bit. If the deactivation workflow fails and is rolled back later, a new physical database will be started with a clean database table such that no cleanup is required.

Various configuration knobs can be implemented for detection logic. For example, some embodiments may implement two opposing master switches which are settable at the logical database level. One switch is "always deactivate: where the other is "never deactivate". These switches will trump all other configurations except the inactive duration.

The following illustrates details with respect to database activation. In the following example, it is assumed that a first user connection is made to a database while the database is not in an active state. The login path, for some embodiments, will be as follows:

1. The login path of the cluster looks up its metadata for given user database.
2. As a result, a logical database is found in a deactivated state.
3. Start activation for this database.
4. The workflow service will trigger the database activation workflow.
5. The workflow service will then wait for database activation workflow operations to complete.
6. The workflow service will send back a response to the cluster 128 (in response to the request received in step 3) with the location of the instance node.
7. In parallel, the workflow service will also update metadata for future connections.
8. The login path will lead to making a connection directly to the new physical database instance.
9. The new physical database instance will send a login response to the user.

Additional details are now illustrated for some embodiments with respect to steps 2 and 3 above. In some embodiments, the workflow service will launch a new service at the identified port (after confirming that the port is valid to use) listening for new database activation workflow requests.

A new service will start to listen on the port.

Additional details are now illustrated for some embodiments with respect to step 4. Embodiments will pack each qualified database instance, hence avoiding the need for additional instances if possible.

A database engine keeps track of CPU, memory, and I/O resource usage by user and system workload. The dynamic deactivation described herein can implement its activeness detection right within the workflow service core, and hence it can reliably identify user vs system usage.

In some embodiments, workload activeness pattern can be analyzed to deactivate when the likelihood of new activity is below certain threshold. For example, this can be determined by machine learning or other heuristic analysis that can determine a probability of the action on a database occurring.

Some embodiments may determine to activate a database in advance by examining heuristics of past activation patterns.

Alternatively or additionally, some embodiments will activate a database to an appropriate instance size to accommodate anticipated workload for a database.

A database can be deactivated from one physical cluster/machine, releasing its capacity back to system. When a user connection comes in, an activation workflow will be initiated and will find an appropriate cluster and/or machine to start the database server process and database there. Thus, in some embodiments, the activation workflow can serve as an effective load balancer in a cloud environment.

Inactiveness detection and deactivation intervals may be configurable. This can be used to help dynamically support elastic capacity of clusters.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
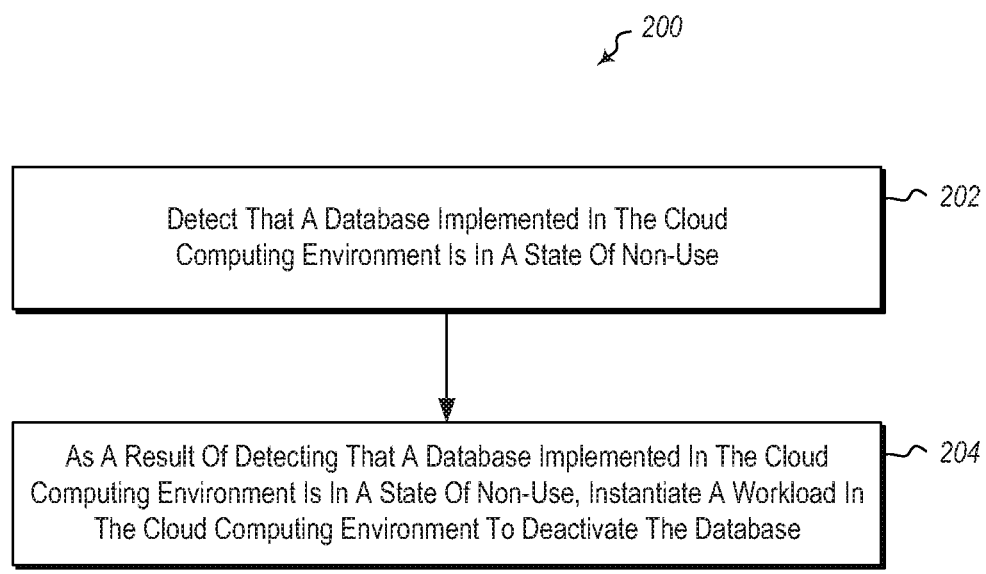
FIG. 2 illustrates a method of managing databases.

Referring now to FIG. 2, a method 200 is illustrated. The method 200 may be practiced in a cloud computing environment. The method 200 includes acts for managing databases implemented in the cloud computing environment to create a more efficient cloud computing environment by deactivating cold databases thereby conserving computing resources.

The method includes detecting that a database implemented in the cloud computing environment is in a state of non-use (act 202).

As a result of detecting that a database implemented in the cloud computing environment is in a state of non-use, the method 200 further includes instantiating a workload in the cloud computing environment to deactivate the database (act 204). The workload is configured to store metadata for the database and database data remotely in cloud storage such that the database can be reactivated at a later time. Thus, for example, a deactivation workflow could store database metadata 122 and database data 124 (e.g., database tables) in the remote storage 126. Remote storage is storage accessible somewhere in the same cloud environment, but not on the local database node. A user who owns a database in the cloud environment also owns their share of remote storage. When their database is not used for a long period of time—hence considered cold, deactivation will remove the runtime components from local database node but keep what is in remote storage intact The method 200 may include reactivating the database. In some such embodiments, the method 200 may further include detecting user interaction directed at the database. Reactivating the database may be performed as a result of detecting user interaction directed at the database. For example, a user may wish to interact with a database that has been deactivated.

Alternatively or additionally, such embodiments of the method 200 may further include detecting system interaction, exclusive of user interaction, directed at the database. In such embodiments, reactivating the database is performed as a result of detecting system interaction, exclusive of user interaction, directed at the database. Thus for example, system updates or other system interaction may cause the database to be reactivated.

Alternatively or additionally, such embodiments of the method 200 may further include detecting identifying potential database interaction (e.g., scheduled updates, known user habits, etc.). In such embodiments, reactivating the database is performed as a result of identifying potential database interaction.

The method 200 may be practiced where detecting that the database implemented in the cloud computing environment is in a state of non-use comprises detecting that the database has not been used for a predetermined amount of time. For example, embodiments may implement a cycle which checks whether or not a database has been used. In some embodiments, the predetermined amount of time may be a predetermined number of cycle checks. Alternatively or additionally, the predetermined amount of time may be a predetermined elapsed time.

In some embodiments, even though the predetermined amount of time has elapsed, some embodiments may determine that the user is likely to use the database within that some short period of time. Thus for example consider a case where embodiments will note that the user will very likely use the database every eight days. If the predetermined period of time is seven days, some embodiments and will determine to not deactivate the database due to the cost of deactivating and reactivating the database given that the database will likely be used within a day.

The method may be practiced where detecting that the database implemented in the cloud computing environment is in a state of non-use comprises detecting that the database is unlikely to be used for a period of time based on aggressive detection methods. For example, embodiments may use external methods, other than determining that the database has not been used to predict that the database will not be used for an extended period of time. For example, embodiments may implement user specific logic to determine that a database will likely not be used. For example, embodiments may examine calendar entries for a user to identify that the user will likely be unable or unlikely to use the database based on the user's calendar entries. Alternatively or additionally, embodiments may have knowledge about a user's vacation schedule that can help the system identify that the user is unlikely to use the database. Alternatively or additionally, embodiments may be able to use a user's historical usage of the database to be able to identify that the user is unlikely to use the database for some extended period of time. Etc.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more non-transitory computer-readable media having stored thereon instructions that are executable by the one or more processors to configure the computer system to manage databases implemented by one or more clusters in a cloud computing environment, including instructions that are executable to configure the computer system to perform at least the following:
   detect that a database implemented in the cloud computing environment is in a state of non-use; and
   as a result of detecting that a database implemented in the cloud computing environment is in a state of non-use, instantiate a deactivation workflow by a workflow service coupled to the one or more clusters in the cloud computing environment to deactivate the database, wherein the deactivation workflow is configured to:
      determine if a new connection was initiated during deactivation of the database;
      in response to determining a new connection was initiated during the deactivation, cancel the deactivation workflow; and
      in response to determining that a new connection was not initiated, store metadata for the database and database data remotely in cloud storage such that the database can be reactivated at a later time;
   identify a database interaction for the database; and
   trigger, by a cluster of the one or more clusters in the cloud computing environment, the workflow service to start an activation workflow to reactivate the database in response to the identifying the database interaction.

2. The computer system of claim 1, wherein to identify the database interaction for the database, the instructions are executable to configure the computer system to:
   detect user interaction directed at the database; and
   wherein reactivating the database is configured to be performed as a result of detecting user interaction directed at the database.

3. The computer system of claim 1, wherein to identify the database interaction for the database, the instructions are executable to configure the computer system to:
   detect system interaction, exclusive of user interaction, directed at the database; and
   wherein reactivating the database is configured to be performed as a result of detecting system interaction, exclusive of user interaction, directed at the database.

4. The computer system of claim 1, wherein to identify the database interaction for the database, the instructions are executable to configure the computer system to:
   identify potential database interaction; and
   wherein reactivating the database is configured to be performed as a result of identifying potential database interaction.

5. The computer system of claim 1, wherein detecting that the database implemented in the cloud computing environment is in a state of non-use comprises detecting that the database has not been used for a predetermined amount of time.

6. The computer system of claim 1, wherein detecting that the database implemented in the cloud computing environment is in a state of non-use comprises detecting that the database is unlikely to be used for a period of time based on aggressive detection methods.

7. The computer system of claim 1, wherein the one or more non-transitory computer-readable media further have stored thereon instructions that are executable by the one or more processors to configure the computer system to perform at least the following:
   indicate, in a database table, a deactivation status that the database is being deactivated.

8. In a cloud computing environment, a method of managing databases implemented by one or more clusters in the cloud computing environment, the method comprising:
   detecting that a database implemented in the cloud computing environment is in a state of non-use; and
   as a result of detecting that a database implemented in the cloud computing environment is in a state of non-use, instantiating a deactivation workflow by a workflow service coupled to the one or more clusters in the cloud computing environment to deactivate the database, wherein the deactivation workflow is configured to:
      determine if a new connection was initiated during deactivation of the database;
      in response to determining a new connection was initiated during the deactivation, cancel the deactivation workflow; and
      in response to determining that a new connection was not initiated, store metadata for the database and database data remotely in cloud storage such that the database can be reactivated at a later time;
   identify a database interaction for the database; and
   trigger, by a cluster of the one or more clusters in the cloud computing environment, the workflow service to start an activation workflow to reactivate the database in response to the identifying the database interaction.

9. The method of claim 8, wherein the identifying the database interaction for the database comprises detecting user interaction directed at the database; and
   wherein reactivating the database is performed as a result of detecting user interaction directed at the database.

10. The method of claim 8, wherein the identifying the database interaction for the database comprises detecting system interaction, exclusive of user interaction, directed at the database; and wherein reactivating the database is performed as a result of detecting system interaction, exclusive of user interaction, directed at the database.

11. The method of claim 8, further comprising: wherein the identifying the database interaction for the database comprises identifying potential database interaction; and wherein reactivating the database is performed as a result of identifying potential database interaction.

12. The method of claim 8, wherein detecting that the database implemented in the cloud computing environment is in a state of non-use comprises detecting that the database has not been used for a predetermined amount of time.

13. The method of claim 8, wherein detecting that the database implemented in the cloud computing environment is in a state of non-use comprises detecting that the database is unlikely to be used for a period of time based on aggressive detection methods.

14. The method of claim 8, further comprising:

indicating, in a database table, a deactivation status that the database is being deactivated.

15. A computer system comprising:

one or more clusters configured to host databases for users in a cloud computing environment;

remote cloud storage coupled to the one or more clusters, wherein the remote storage is configured to store metadata for databases and database data remotely from the clusters;

one or more processors; and one or more non-transitory computer-readable media having stored thereon instructions that are executable by the one or more processors, the instructions comprising:

a workflow service coupled to the one or more clusters, and wherein the workflow service is configured to:

detect that a database implemented in the cloud computing environment is in a state of non-use and to instantiate a deactivation workflow in the cloud computing environment to deactivate the database, wherein the deactivation workflow is configured to:

determine if a new connection was initiated during deactivation of the database;

in response to determining a new connection was initiated during the deactivation, cancel the deactivation workflow; and in response to determining that a new connection was not initiated, store metadata for the database and database data remotely in the remote cloud storage such that the database can be reactivated at a later time;

identify a database interaction for the database; and start an activation workflow to reactivate the database in response to the identifying the database interaction.

16. The computer system of claim 15, wherein to identify the database interaction for the database, the workflow service is configured to detect user interaction directed at the database; and wherein the workflow service is configured to start the activation workflow to reactivate the database as a result of detecting user interaction directed at the database.

17. The computer system of claim 15, wherein to identify the database interaction for the database, the workflow service is configured to detect system interaction, exclusive of user interaction, directed at the database; and wherein the workflow service is configured to start the activation workflow to reactivate the database as a result of detecting system interaction, exclusive of user interaction, directed at the database.

18. The computer system of claim 15, wherein to identify the database interaction for the database, the workflow service is configured to identify potential database interaction; and wherein the workflow service is configured to start the activation workflow to reactivate the database as a result of identifying potential database interaction.

19. The computer system of claim 15, wherein the workflow service is configured to detect that a database implemented in the cloud computing environment is in a state of non-use by detecting that the database has not been used for a predetermined amount of time.

20. The computer system of claim 15, wherein to detect that the database implemented in the cloud computing environment is in a state of non-use, the workflow service is configured to detect that the database is unlikely to be used for a period of time.

* * * * *